United States Patent
Dickson et al.

(10) Patent No.: US 11,682,775 B2
(45) Date of Patent: Jun. 20, 2023

(54) BIPOLAR PLATE, FUEL CELL, AND MOTOR VEHICLE

(71) Applicants: Audi AG, Ingolstadt (DE); Volkswagen AG, Wolfsburg (DE)

(72) Inventors: Brian Walter Dickson, Burnaby (CA); Andrew Desouza, Burnaby (CA)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 298 days.

(21) Appl. No.: 16/962,125

(22) PCT Filed: Jan. 11, 2019

(86) PCT No.: PCT/EP2019/050668
§ 371 (c)(1),
(2) Date: Jul. 14, 2020

(87) PCT Pub. No.: WO2019/141601
PCT Pub. Date: Jul. 25, 2019

(65) Prior Publication Data
US 2020/0350601 A1 Nov. 5, 2020

(30) Foreign Application Priority Data

Jan. 17, 2018 (DE) ..................... 10 2018 200 673.3

(51) Int. Cl.
*H01M 8/0267* (2016.01)
*H01M 8/0258* (2016.01)
(Continued)

(52) U.S. Cl.
CPC ....... *H01M 8/0265* (2013.01); *H01M 4/8631* (2013.01); *H01M 8/0258* (2013.01);
(Continued)

(58) Field of Classification Search
CPC ... H01M 8/0258–0263; H01M 8/0267; H01M 2250/20
See application file for complete search history.

(56) References Cited

U.S. PATENT DOCUMENTS

2006/0216572 A1 9/2006 Yoshida et al.
2007/0254203 A1* 11/2007 Ishida ................ H01M 8/0247
429/457
(Continued)

FOREIGN PATENT DOCUMENTS

CN 107394228 A 11/2017
DE 103 30 832 A1 2/2004
(Continued)

*Primary Examiner* — Eugenia Wang
(74) *Attorney, Agent, or Firm* — Seed Intellectual Property Law Group LLP

(57) ABSTRACT

To provide a space-saving bipolar plate for a fuel cell comprising an anode plate and a cathode plate, anode gas channels and cathode gas channels lead from main gas ports on opposite sides into an active area and are distributed across the width of said area such that they are subsequently diverted towards an opposite distribution area, and the coolant channels branch in the distribution area and, after branching, are diverted towards the anode gas channels and towards the cathode gas channels and, in each region of overlap with the anode gas channels and the cathode gas channels, are diverted collectively such that the coolant channels lead, together with the anode gas channels and the cathode gas channels, into the active area with no overlap and alternatingly with said anode gas channels and cathode gas channels.

7 Claims, 4 Drawing Sheets

(51) Int. Cl.
*H01M 8/0265* (2016.01)
*H01M 4/86* (2006.01)
*H01M 8/1004* (2016.01)

(52) U.S. Cl.
CPC ....... *H01M 8/0267* (2013.01); *H01M 8/1004* (2013.01); *H01M 2004/8694* (2013.01); *H01M 2250/20* (2013.01)

(56) References Cited

U.S. PATENT DOCUMENTS

2008/0131755 A1* 6/2008 Lee .................... H01M 8/0267
 429/434
2017/0025690 A1 1/2017 Andreas-Schott et al.
2018/0145352 A1* 5/2018 Kondo ................ H01M 8/0267

FOREIGN PATENT DOCUMENTS

| DE | 10 2004 058 923 A1 | 7/2005 |
| DE | 10 2010 004 160 A1 | 8/2010 |
| DE | 10 2010 039 276 A1 | 3/2011 |
| DE | 10 2014 206 335 A1 | 10/2015 |
| JP | 2005-268151 A | 9/2005 |
| JP | 2006-196426 A | 7/2006 |

* cited by examiner

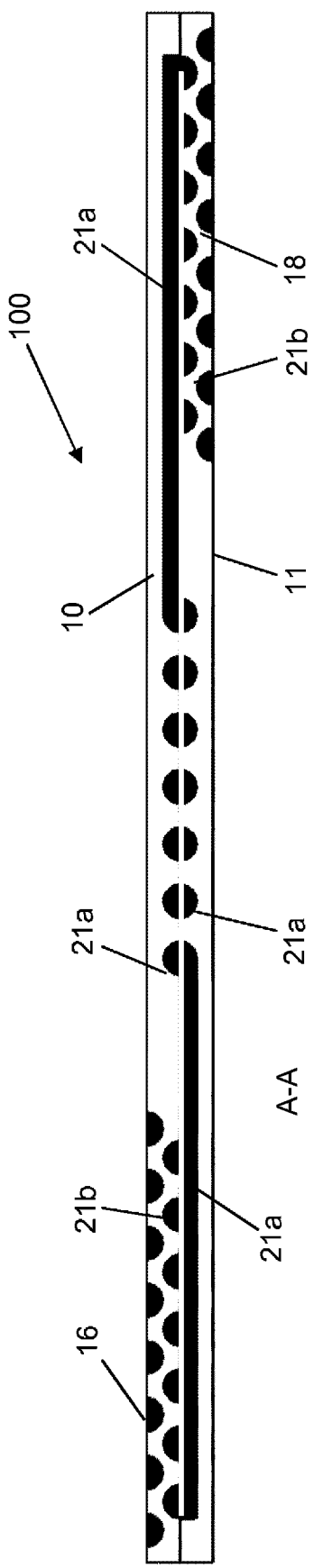
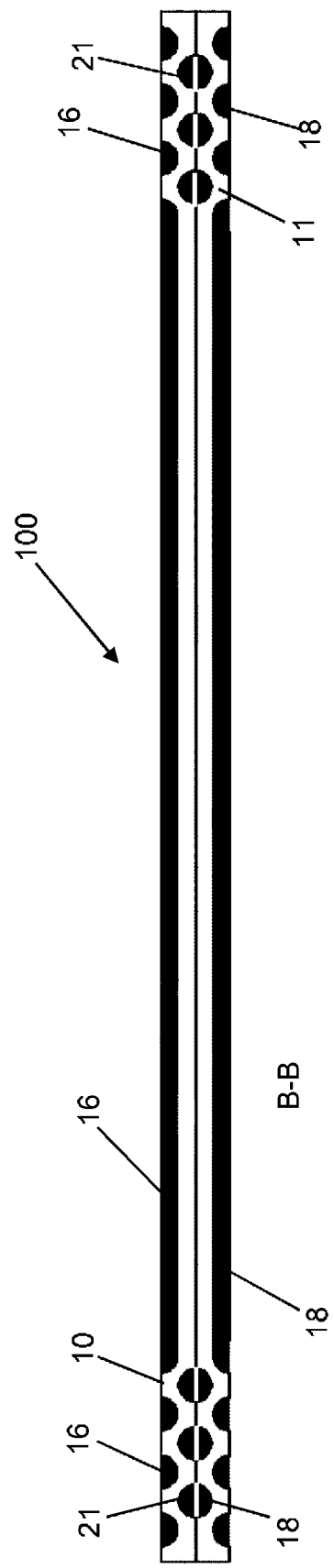
Fig. 4
Fig. 5

BIPOLAR PLATE, FUEL CELL, AND MOTOR VEHICLE

BACKGROUND

Technical Field

Embodiments of the invention relate to a bipolar plate for a fuel cell comprising an anode plate and a cathode plate, each having an active area and two inactive areas, wherein arranged in each inactive area are a supply area having two main gas ports for supplying and discharging reaction gases, and a coolant main port for supplying and discharging coolant, and a distribution area for connecting the two main gas ports and the coolant main port to the active area, wherein the anode plate and the cathode plate are formed and arranged one over the other such that the anode plate has open anode gas channels on the side facing away from the cathode plate and the cathode plate has open cathode gas channels on the side facing away from the anode plate, and that closed coolant channels are formed on the sides of the anode plate and the cathode plate that face one another; and a fuel cell; and a vehicle.

Description of the Related Art

Fuel cells use the chemical conversion of a fuel with oxygen into water in order to generate electrical energy. For this purpose, fuel cells contain as a core component what is known as the membrane electrode assembly (MEA), which is a combination of a proton-conducting membrane and an electrode (anode and cathode) arranged on each of the two sides of the membrane. During operation of the fuel cell, the fuel, especially hydrogen H2 or a gas mixture containing hydrogen, is supplied to the anode, where an electrochemical oxidation with release of electrons takes place ($H_2 \rightarrow 2H^+ + 2\ e^-$).

The protons $H^+$ are transported (water-bound or water-free) in an electrically insulated manner from the anode chamber into the cathode chamber. The electrons provided at the anode are guided to the cathode via an electrical line. The cathode is supplied with oxygen or a gas mixture containing oxygen so that a reduction of the oxygen with absorption of the electrons takes place ($\frac{1}{2}\ O_2 + 2\ e^- \rightarrow O^{2-}$). At the same time, in the cathode chamber these oxygen anions react with the protons transported across the membrane to form water ($2\ H^+ + O^{2-} \rightarrow H_2O$). As a result of the direct conversion of chemical into electrical energy, fuel cells have improved efficiency compared to other electricity generators because the Carnot factor is avoided. Because of a lower diffusion speed of oxygen compared to hydrogen, among other things, the cathode reaction is the speed-limiting element of the fuel-cell reaction.

Generally, the fuel cell is formed by a plurality of membrane electrode assemblies arranged in a stack, the electrical power outputs of which add up. Arranged between each two membrane electrode assemblies of a fuel cell stack is a bipolar plate, which has channels to supply the process gases to the anode or cathode of the adjacent membrane electrode assemblies and coolant channels to dissipate heat. Bipolar plates are made of an electrically conductive material in order to establish the electrical connection. They thus perform the three-fold function of process gas supply for the membrane electrode assemblies, cooling, and electrical connection.

Bipolar plates have different areas arranged one behind the other in a main flow direction of the process gases. These are firstly the main channels or fluid ports via which the reactants and/or the coolant are supplied. This is followed by an inflow area, which leads to a distribution structure. The distribution structure distributes the fluids which are then supplied to a flow field where the chemical reactions described above take place.

Two-part bipolar plates with groove-shaped depressions on the outer sides and the sides that face one another for forming reaction gas channels and coolant channels are known, for example, from DE10330832A1, DE102010039276A1 and DE102010004160A1.

In the area of the distribution structure, all operating media are usually routed one over the other, the resulting basic shape constituting, for example, a triangle. In this triangular form, the media are routed through directional channels to supply the entire width of the flow field with the operating media.

These distribution structures usually have the disadvantage that they take up a lot of space, and because of the conduction of all three media in the bipolar plate one over the other with different flow cross sections, problems can occur at equal pressure, among others.

BRIEF SUMMARY

Embodiments of the invention are now based on the object of providing a bipolar plate which at least in part avoids the disadvantages of the prior art.

A rectangular bipolar plate for a fuel cell having an anode plate and a cathode plate is provided, wherein in each case a rectangular active area and two inactive areas that are arranged on opposite sides of the active area are provided.

Rectangular bipolar plates having rectangular active areas offer increased power density and, especially, an improved material utilization of the MEA.

In this context, two inactive areas does not necessarily mean that only two inactive areas can be present; in certain embodiments of the bipolar plate more than two inactive areas may also be provided.

Both inactive areas each have a supply area with two main gas ports for the supply and discharge of reaction gases, namely anode gas and cathode gas, and a coolant main port for the supply and discharge of coolant, as well as a distribution area for connecting the main gas ports and the coolant main port to the active areas.

The anode plate and the cathode plate are formed and arranged one over the other such that the anode plate has open anode gas channels on the side facing away from the cathode plate and the cathode plate has open cathode gas channels on the side facing away from the anode plate, and that closed coolant channels are formed on the sides of the anode plate and the cathode plate that face each other.

Closed coolant channels means that the coolant channels are closed when the anode plate and the cathode plate are arranged one over the other and are otherwise configured as an open structure in the anode and cathode plates.

In a fuel cell constructed with the bipolar plate according to an embodiment of the invention, the reaction gas channels are covered with an MEA.

In an embodiment of the invention, the anode gas channels and the cathode gas channels are routed from the respective main gas ports through the distribution area to the active area with no overlap.

With no overlap means that the anode gas channels and the cathode gas channels are not routed one over the other in both distribution areas of the anode plate and the cathode plate.

The anode gas channels lead into the active area on one side and the cathode gas channels lead into the active area on the other side, so that they may be spaced apart from one another to the greatest possible extent in order to facilitate a distribution of the reaction gas channels as described below. They are then diverted in the active area and distributed over the width of the active area, wherein, after the distribution over the width of the active area, they are subsequently diverted toward an opposite distribution area.

Since the anode gas channels and the cathode gas channels also run with no overlap, space is required for distribution over the width of the active area. This space is hereinafter also referred to as an active distribution area.

Thus, a reaction gas channel located near the edge of the bipolar plate is routed directly to the opposite distribution area, and the reaction gas channel located farthest inwards on the bipolar plate is diverted as the first reaction gas channel. The reaction gas channels between these two are diverted according to the specification so as not to overlap. The second diversion of the reaction gas channels toward the opposite distribution area is accomplished in the same manner.

After leaving the coolant main port, the coolant channels branch in the distribution area and are diverted toward the anode gas channels and toward the cathode gas channels, wherein in the area of overlap of the coolant channels with the anode gas channels and the cathode gas channels, these are diverted in such a way that the coolant channels open into and lead through the active area with no overlap and alternatingly with the anode gas channels and the cathode gas channels. In the active area, too, the coolant channels run parallel to the reaction gas channels and are diverted with them, thereby enabling a cell reaction.

The reaction gas channels may be diverted at right angles, since this enhances the effect obtained by the use of a rectangular bipolar plate.

The embodiment described above results in the active distribution area being created in the junction area of the active area, in which active distribution area anode gas channels and cathode gas channels, in each case in combination with the coolant channels, are distributed over the width of the active area.

In combination with the design of the distribution areas, there results a significant increase in the power density of the bipolar plate compared to bipolar plates from the prior art since, on the one hand, comparatively thin bipolar plates can be realized and, on the other hand, the partial distribution of the media in the active area makes it possible for this active area to be expanded at the expense of the distribution areas.

In some embodiments, the main coolant port is arranged in the supply areas between the two main gas ports for the anode gas and the cathode gas, so that an arrangement of the reaction gas channels and the coolant channels in the distribution area can be achieved in a geometrically simple manner.

In some embodiments, first coolant channels, which extend from the coolant main port and terminate in a dead end in the distribution area, and second coolant channels, which extend from the active area and terminate in a dead end in the distribution area, are provided in order to form the branched coolant channels in both distribution areas of the anode plate. In addition, first coolant channels, which extend from the coolant main port and terminate in a dead end in the distribution area, and second coolant channels, which extend from the active area and terminate in a dead end in the distribution area, are provided in both distribution areas of the cathode plate. The first coolant channels of the anode plate form a fluid connection with the second coolant channels of the cathode plate and the first coolant channels of the cathode plate form a fluid connection with the second coolant channels of the anode plate.

This embodiment allows for a very simple design of the routing of the different channels for the operating media.

The branching of the coolant channels likewise may take place at right angles in order to minimize the space requirement of the distribution area.

The fluid connection of the first coolant channels of the anode plate with the second coolant channels of the cathode plate and the first coolant channels of the cathode plate with the second coolant channels of the anode plate may be provided in the region of the distribution area in which the first coolant channels and the second coolant channels terminate in a dead end. This embodiment ensures that no dead volumes are present in the coolant channels, but instead the coolant at the dead end is only diverted from the anode plate into the cathode plate and vice versa.

The first coolant channels of the anode plate and the cathode plate may be partially arranged in such a way that they form common first coolant channels. These commonly formed coolant channels may be arranged directly at the coolant main port and extend away from the latter toward the active area until they are diverted away from the anode gas channels in the anode plate and from the cathode gas channels in the cathode plate. In this section, no common first coolant channels are formed, but rather separate first coolant channels are formed in the anode plate and the cathode plate. This section of the first coolant channels is diverted away from the respective reaction gas channels, the first coolant channels running at a distance from the active area and terminating in dead ends.

In a plan view, the coolant channels of the bipolar plate exhibit a T-shaped structure in each distribution area.

The second coolant channels may run in both distribution areas in the region in which the reaction gas channels extend from the active area to the respective main port, such as parallel to the reaction gas channels, so that the routing of the individual channels can be as space-saving as possible. The coolant channels may be arranged offset relative to the reaction gas channels, so that a larger flow cross section can be selected.

The second coolant channels of the anode plate may terminate in a dead end in the region of the anode gas channels and the second coolant channels of the cathode plate may terminate in a dead end in the region of the cathode gas channels, so that the space requirement for these structures in the distribution area can be kept small.

In some embodiments of the distribution area of a bipolar plate or of the anode and cathode plates which are joined together to form a bipolar plate, it is possible for only two operating media, i.e., in each case a reaction gas and the coolant, to have to be routed one over the other within the bipolar plate in a space-saving manner, wherein the coolant channels can have different flow cross sections and/or heights in different sections.

Thus, in some embodiments, an area requirement of the inactive areas in a bipolar plate can be reduced overall, so that, in turn, the active area can be designed to be correspondingly larger, and the corresponding fuel cell's power can be increased.

The active area of the bipolar plate can be designed in various ways. Straight reaction gas channels and coolant channels are thus possible options. However, channels with deflections and other configurations are also possible.

In the distribution area, the coolant channels may be formed with different flow cross sections and/or heights in different regions in order to form bipolar plates that are as flat as possible.

The bipolar plate may be rectangular, and the inactive areas may be located at opposite ends of the bipolar plate, the rectangular active area being formed between the inactive areas.

Embodiments of the invention further relate to a fuel cell comprising at least two previously described bipolar plates, between which a membrane electrode assembly is arranged, and a motor vehicle in which such a fuel cell is arranged.

The various embodiments mentioned in this application may be combined with each other unless stated otherwise in individual cases.

BRIEF DESCRIPTION OF THE SEVERAL VIEWS OF THE DRAWINGS

Embodiments of the invention are described herein with reference to the respective drawings.

FIG. 4 illustrates a sectional view along a section A-A shown in FIG. 1 of the bipolar plate of FIG. 1; and FIG. 5 illustrates a sectional view along a section B-B shown in FIG. 1 of the bipolar plate of FIG. 1.

DETAILED DESCRIPTION

Figure 1:
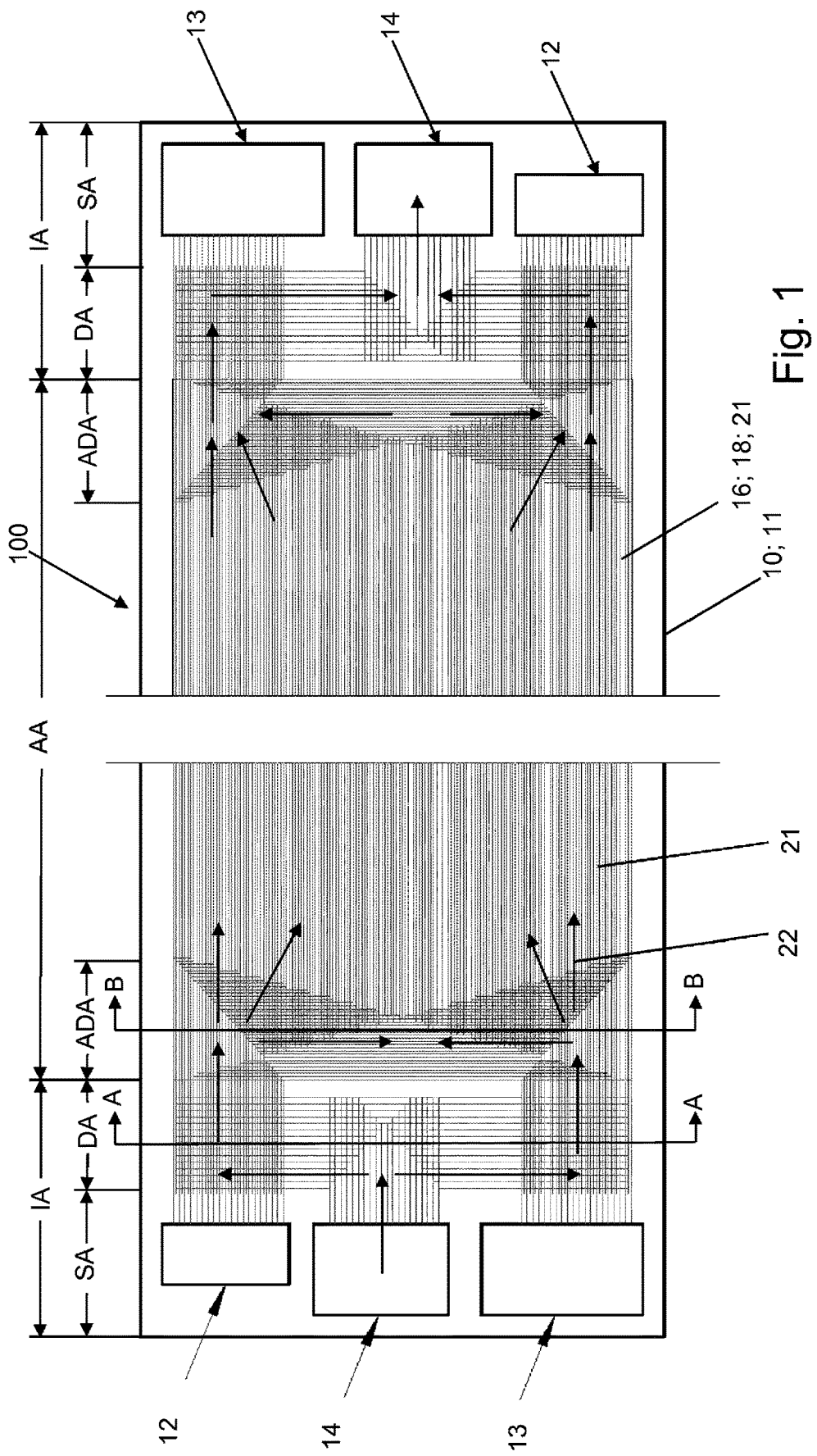
FIG. 1 illustrates a schematic view of a bipolar plate.
Figure 2:
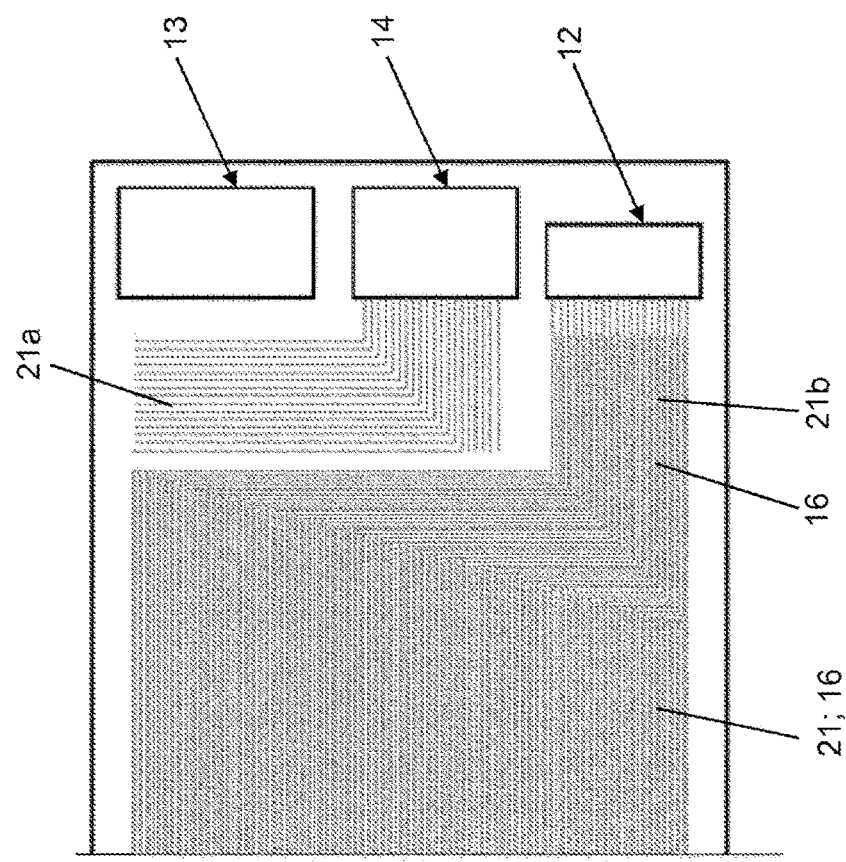
FIG. 2 illustrates a schematic view of an anode plate of the bipolar plate of FIG. 1.
Figure 2:
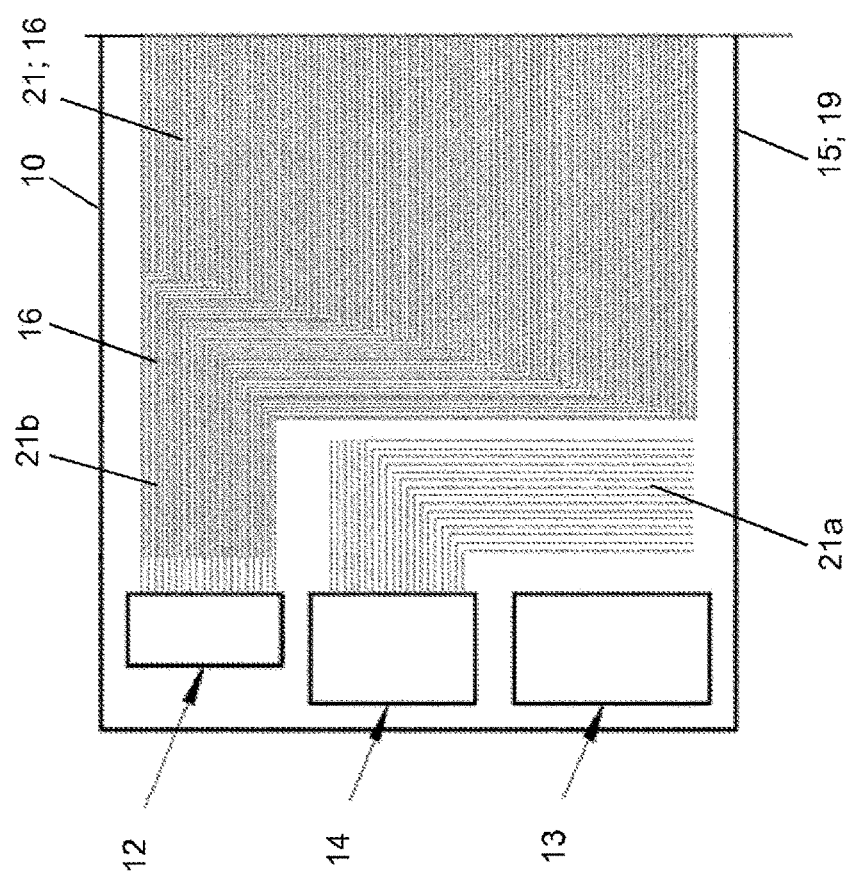
Figure 3:
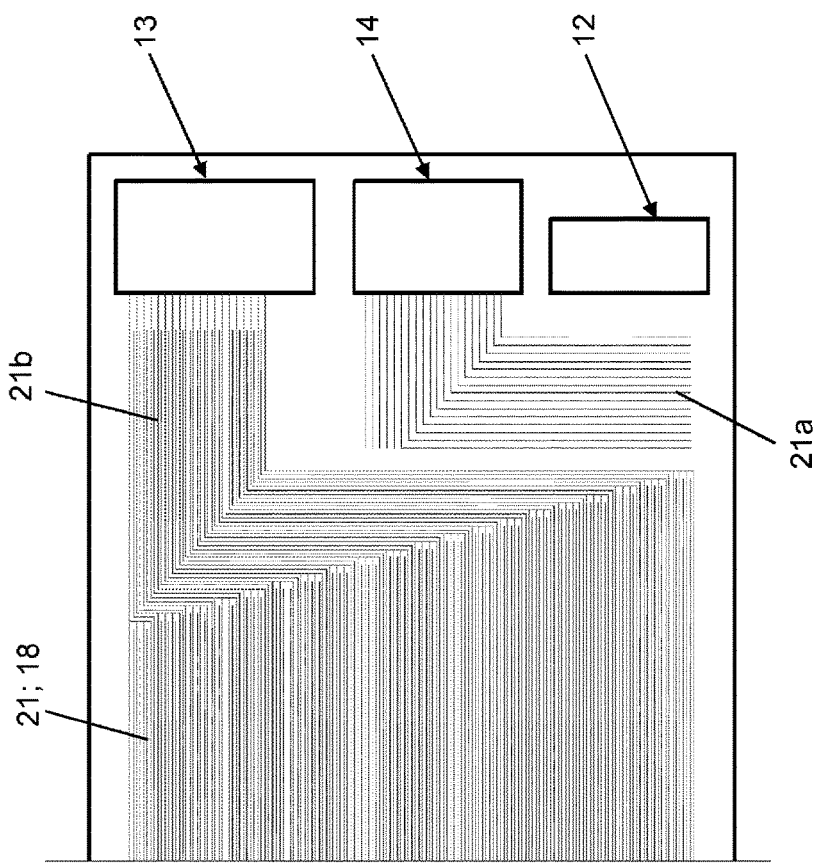
FIG. 3 illustrates a schematic view of a cathode plate of the bipolar plate of FIG. 1.
Figure 3:
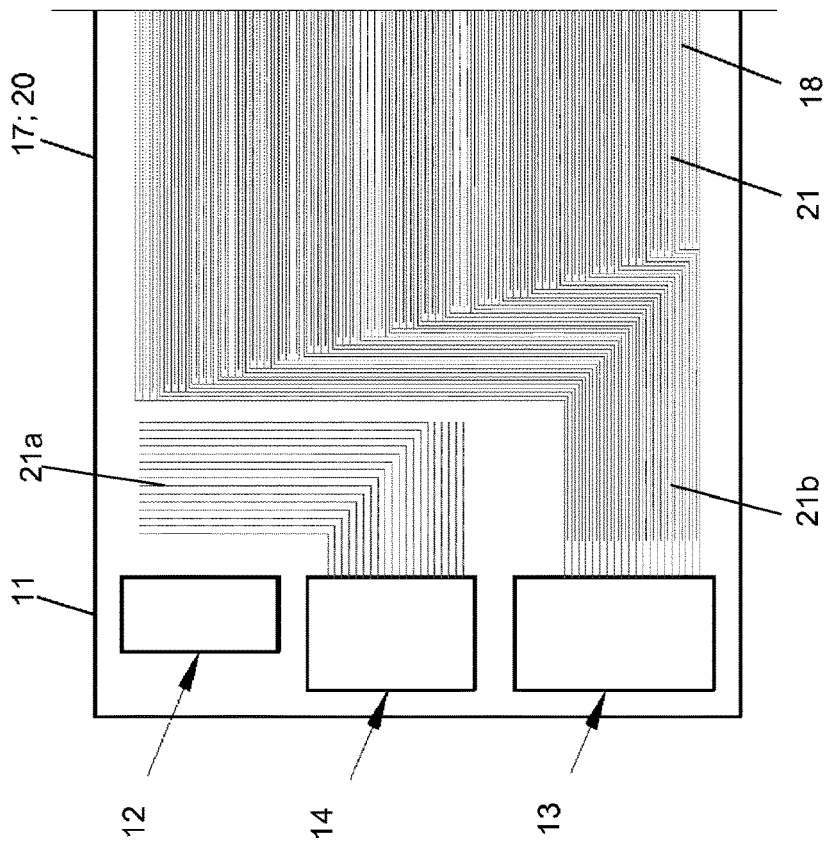

The rectangular bipolar plate 100 according to FIG. 1 for a fuel cell (not shown) has an anode plate 10 (FIG. 2) and a cathode plate 11 (FIG. 3), which are arranged one over the other to form bipolar plate 100. The structures illustrated in FIGS. 1 to 3 are visible independently of how they are arranged on specific sides of anode plate 10 and cathode plate 11.

The anode plate 10 and the cathode plate 11 and, thus, the bipolar plate 100 have a centrally arranged and rectangular active area AA in which the cell reaction takes place for a fuel cell. This active area AA is also referred to as a flow field. On two opposite sides of the bipolar plate 100 and thus on opposite sides of the active area AA, an inactive area IA is provided in each case which is subdivided into a supply area SA having two main gas ports 12, 13 for supplying and discharging reaction gases (anode gas and cathode gas) and a coolant main port 14 for supplying and discharging coolant, and a distribution area DA for connecting the main gas ports 12, 13 and the coolant main port 14 to active area AA.

Explanations below always relate to both inactive areas IA and especially both distribution areas DA, even if the description takes place in the singular.

The main gas ports 12, 13 and the coolant main port 14 are arranged such that they are substantially aligned with one another in a fuel cell stack, not shown here, and form main supply channels within the fuel cell stack.

The coolant main port 14 is arranged between the main port 12 for the anode gas and the main port 13 for the cathode gas for optimal utilization of the available space in the inactive area IA and in the distribution area DA.

Furthermore, the anode plate 10 and the cathode plate 11 are formed and arranged one over the other such that anode plate 10 has open anode gas channels 16 on the side 15 facing away from the cathode plate 11 and the cathode plate 11 has open cathode gas channels 18 on the side 17 facing away from the anode plate 10.

The anode gas channels 16 and the cathode gas channels 18 are routed from the main gas ports 12, 13 through the distribution area DA with no overlap. The anode gas channels 16 and the cathode gas channels 18 then open into the active area AA. This is done on opposite sides of the bipolar plate 100. In the active area AA, the anode gas channels 16 and the cathode gas channels 18 are diverted at right angles and distributed across the width of the active area AA. After the distribution over the width of the active area AA, there is a second perpendicular diversion toward the opposite respective distribution area DA. Since space is required for the two-fold diversion of the anode gas channels 16 and the cathode gas channels 18 so that they extend directly to the opposite distribution area DA, an active distribution area ADA is produced in the active area AA. The cell reaction likewise takes place in the active distribution area ADA, as in the other active area AA.

Closed coolant channels 21, 21a, 21b are formed on the sides 19, 20 of the anode plate 10 and the cathode plate 11 which face each other and which are present in the anode plate 10 and in the cathode plate 11 as open coolant channels 21, 21a, 21b and only become closed coolant channels 21, 21a, 21b by the arrangement of one over the other. In the bipolar plate 100, the coolant channels 21, 21a, 21b are present such that the coolant channels 21, 21a, 21b branch in a T-shape in the distribution area DA after exiting from the coolant main port 14 and are diverted toward the anode gas channels 16 and toward the cathode gas channels 18 after branching.

The branched coolant channels 21, 21a, 21b then form a region of overlap with the anode gas channels 16 and the cathode gas channels 18, the coolant channels 21, 21a, 21b being diverted in the region of overlap, so that they run in the same direction as the respective anode gas channels 16 and cathode gas channels 18.

First coolant channels 21a and second coolant channels 21b are arranged in the distribution area DA of the anode plate 10 and the cathode plate 11, respectively, to form the previously described coolant channels 21, 21a, 21b. The first coolant channels 21a lead from the coolant main port 14 into the distribution area DA and are diverted upstream of the active area AA in such a way that, in the anode plate 10, they veer away from the main gas port 12 for the anode gas and, in the cathode plate 11, they veer away from the main gas port 13 for the cathode gas and then run parallel to the active area AA. The first coolant channels 21a of the anode plate 10 terminate in a dead end between the main gas port 13 for the cathode gas and the active area AA, and the first coolant channels 21a of the cathode plate terminate in a dead end between the main gas port 12 for the anode gas and the active area AA.

The second coolant channels 21b lead from the active area AA to the two main gas ports 12, 13 and are arranged one over the other offset from the anode gas channels 16 or the cathode gas channels. The second coolant channels 21b terminate in a dead end in the distribution area DA. When the anode plate 10 and the cathode plate 11 are arranged one over the other, the first coolant channels 21a of the anode plate 10 connect to the second coolant channels 21b of the cathode plate 11 and the first coolant channels 21a of the cathode plate 11 connect to the second coolant channels 21b of the anode plate 10.

The fluid connection between the first coolant channels 21a and the second coolant channels 21b is shown in FIG. 4, which depicts the section through the bipolar plate 100 along the line A-A. The first coolant channels 21a of anode plate 10 and cathode plate 11, which are combined to form a common first coolant channel 21a, are shown in the center. They are shown in cross section. The diversion of the first coolant channels 21a from the anode plate 10 and the cathode plate 11 in opposite directions is shown through longitudinally sectioned first coolant channels 21a. These then meet second coolant channels 21b in the respective other plate 10, 11, shown in cross section. In the region of this fluid connection, the anode gas channels 16 or the cathode gas channels 18 are arranged parallel and at the same time offset, above and below the second coolant channels 21b.

Since the anode gas channels 16 and the cathode gas channels 18 each enter on opposite sides of the active area AA in connection with second coolant channels 21b, they are distributed over the width of the active area AA after entering. The resulting coolant flows are represented by arrows 22.

The structures provided for distributing the operating media across the width of the active area AA are reproduced in FIG. 5, which shows the section B-B through the bipolar plate 100. Longitudinally sectioned anode gas channels 16 and cathode gas channels 18 are shown in the center, and cross-sectioned anode gas channels 16 and cathode gas channels 18 between which coolant channels 21 run are shown on both sides. Together with FIG. 1, a concrete picture of the transverse distribution of the operating media is produced, but this is only exemplary and not limiting.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A bipolar plate for a fuel cell, comprising:
   an anode plate and a cathode plate, each of the anode plate and the cathode plate having a respective active area and two respective inactive areas;
   wherein each inactive area includes a supply area with two main gas ports for supply or discharge of reaction gases and a coolant main port for supply or discharge of coolant, and a distribution area for connecting the two main gas ports and the coolant main port to the respective active area;
   the anode plate and the cathode plate being formed and arranged one over the other such that the anode plate has open anode gas channels facing away from the cathode plate and the cathode plate has open cathode gas channels facing away from the anode plate, and that closed coolant channels are formed on the sides of the anode plate and the cathode plate that face one another;
   wherein the anode gas channels and the cathode gas channels are routed with no overlap from the main gas ports at a first end of the bipolar plate through the distribution area at the first end of the bipolar plate and lead into the respective active area on opposite sides of the bipolar plate, are diverted within the respective active area and are distributed across the width of the respective active area;
   wherein the anode gas channels and the cathode gas channels are diverted toward the distribution area at a second end of the bipolar plate opposite to the first end of the bipolar plate;
   wherein the coolant channels branch in the distribution areas and are diverted towards the anode gas channels and towards the cathode gas channels and overlap with the anode gas channels and the cathode gas channels in a region of overlap and are diverted collectively such that the coolant channels, together with the anode gas channels and the cathode gas channels, lead into the respective active area with no overlap and such that the coolant channels alternate and run parallel with said anode gas channels and cathode gas channels through the respective active area;
   wherein, for formation of the branched coolant channels:
   in both distribution areas of the anode plate, first coolant channels which extend from the coolant main port and terminate in a dead end in the distribution area and second coolant channels which extend from the active area of the anode plate and terminate in a dead end in the distribution area are provided;
   in both distribution areas of the cathode plate, first coolant channels which extend from the coolant main port and terminate in a dead end in the distribution area are provided, and second coolant channels which extend from the active area of the cathode plate and terminate in a dead end in the distribution area are provided; and
   the first coolant channels of the anode plate are in fluid connection with the second coolant channels of the cathode plate and the first coolant channels of the cathode plate are in fluid connection with the second coolant channels of the anode plate.

2. The bipolar plate according to claim 1, wherein the bipolar plate is rectangular and/or each of the active areas is rectangular.

3. The bipolar plate according to claim 1, wherein the anode gas channels, the cathode gas channels, and the coolant channels are diverted at right angles.

4. The bipolar plate according to claim 1, wherein, in each supply area, the respective coolant main port is arranged between the two respective main gas ports.

5. The bipolar plate according to claim 1, wherein the coolant channels have different flow cross sections and/or heights in different regions within the distribution area.

6. A fuel cell comprising at least two bipolar plates according to claim 1 and a membrane electrode assembly arranged between said plates.

7. A motor vehicle having the fuel cell system according to claim 6.

* * * * *